(12) United States Patent
Bryant et al.

(10) Patent No.: US 9,467,367 B2
(45) Date of Patent: Oct. 11, 2016

(54) UNIVERSAL LABELS IN INTERNETWORKING

(71) Applicant: Cisco Technology, Inc., San Jose, CA (US)

(72) Inventors: Stewart Frederick Bryant, Merstham (GB); Daniel C. Frost, Middlesex (GB); Neil Jarvis, Midlothian (GB); George L. Swallow, Boston, MA (US)

(73) Assignee: Cisco Technology, Inc., San Jose, CA (US)

( * ) Notice: Subject to any disclaimer, the term of this patent is extended or adjusted under 35 U.S.C. 154(b) by 459 days.

(21) Appl. No.: 13/835,190

(22) Filed: Mar. 15, 2013

(65) Prior Publication Data

US 2014/0269714 A1   Sep. 18, 2014

(51) Int. Cl.
H04L 12/723   (2013.01)

(52) U.S. Cl.
CPC .................... H04L 45/50 (2013.01)

(58) Field of Classification Search
CPC ....... H04L 45/22; H04L 45/28; H04L 45/50; H04L 45/74; H04L 45/507; H04L 45/745; H04L 12/4641; H04L 12/4633; H04L 45/00; H04L 45/44; H04L 45/54; H04L 45/566; H04L 47/2458; H04L 47/825; H04L 49/3009; H04L 69/22; H04L 2212/00
See application file for complete search history.

(56) References Cited

U.S. PATENT DOCUMENTS

| | | | | |
|---|---|---|---|---|
| 6,850,513 B1* | 2/2005 | Pelissier | ............... | H04L 45/302 370/351 |
| 7,373,401 B1* | 5/2008 | Azad | ............................ | 709/224 |
| 8,339,973 B1* | 12/2012 | Pichumani | .............. | H04L 43/10 370/248 |
| 2002/0009050 A1* | 1/2002 | Ueno | ..................... | H04L 45/00 370/230 |
| 2003/0065772 A1* | 4/2003 | Hata | ................... | H04L 12/4641 709/224 |
| 2005/0097219 A1* | 5/2005 | Goguen et al. | ............... | 709/238 |
| 2008/0025309 A1* | 1/2008 | Swallow | ...................... | 370/392 |
| 2009/0135833 A1* | 5/2009 | Lee | ..................... | H04L 12/4645 370/395.53 |
| 2010/0158010 A1* | 6/2010 | Kang | ..................... | H04L 45/00 370/392 |
| 2010/0254385 A1* | 10/2010 | Sharma | .............. | H04L 12/4633 370/392 |
| 2011/0032843 A1* | 2/2011 | Papp | .................. | H04L 12/4666 370/254 |
| 2012/0051212 A1* | 3/2012 | Xu et al. | ....................... | 370/223 |
| 2015/0003458 A1* | 1/2015 | Li | ......................... | H04L 45/507 370/392 |

(Continued)

FOREIGN PATENT DOCUMENTS

WO    WO 2004/114634    12/2004

OTHER PUBLICATIONS

Rosen et al.; RFC 3032: MPLS Label Stack Encoding; IETF; Jan. 2001.*

(Continued)

*Primary Examiner* — Michael Thier
*Assistant Examiner* — Eric Nowlin
(74) *Attorney, Agent, or Firm* — Hickman Palermo Becker Bingham LLP; Malgorzata A. Kulczycka

(57) ABSTRACT

In an embodiment, a method comprises: receiving a data communications packet comprising one or more labels in a label stack; determining whether a table identifier is present in the label stack. In response to determining that the table identifier is present in the label stack: based, at least in part, on the table identifier, a label table is determined; a next hop for the data communications packet is determined by performing a next-hop lookup in the label table using at least one of the one or more labels; and the data communications packet is forwarded to the next hop. In an embodiment, the method is performed by one or more computing devices.

20 Claims, 7 Drawing Sheets

(56) References Cited

U.S. PATENT DOCUMENTS

| | | | |
|---|---|---|---|
| 2015/0003463 A1* | 1/2015 | Li | H04L 45/507 370/395.53 |
| 2016/0142293 A1* | 5/2016 | Hu | H04L 45/745 370/392 |

OTHER PUBLICATIONS

Andersson et al.; RFC 5462: Multiprotocol Label Switching (MPLS) Label Stack Entry: "EXP" Field Renamed to "Traffic Class" Field; IETF; Feb. 2009.*

Berger et al.; RFC 3473: Generalized Multi-Protocol Label Switching (GMPLS) Signaling Resource Reservation Protocol-Traffic Engineering (RSVP-TE) Extensions; IETF; Jan. 2003.*

Kompella et al., Allocating and Retiring Special-Purpose MPLS Labels, Jun. 2014, Internet Engineering Task Force (IETF), pp. 1-11.*

Rosen et al., BGP/MPLS IP Virtual Private Networks (VPNs), Feb. 2006, Internet Engineering Task Force (IETF), Network Working Group, pp. 1-47.*

Kompella et al., Allocating and Retiring Special-Purpose MPLS Labels: draft-kompella-mpls-special-purpose-labels-01, Oct. 15, 2012, Internet Engineering Task Force (IETF), pp. 1-10.*

Rosen Cisco Systems et al., "Multiprotocol Label Switching Architecture", dated Jan. 1, 2001, 62 pages.

European Patent Office, "Search Report" in application No. PCT/US2014/021380, dated Jun. 20, 2014, 11 pages.

Claims in European Case, in application No. PCT/2014/021380, dated Jun. 2014, 5 pages.

* cited by examiner

UNIVERSAL LABELS IN INTERNETWORKING

TECHNICAL FIELD

The present disclosure is generally related to network data communications.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The internet standard denoted MPLS (multi-protocol label switching) provides a data-carrying mechanism in which data packets are transmitted between network infrastructure elements, such as routers and switchers, according to labels identifying nodes and/or networks. A label is usually carried in a label stack entry of a data packet, and the entry usually comprises a 20-bit-long label field for storing the label.

Because the size of the label field in the data packet is limited, instead of encapsulating an actual Internet Protocol (IP) address of a node in the data packet, MPLS usually uses nicknames associated with the IP addresses. The nicknames may be distributed between routers using the Label Distribution Protocol (LDP), and the routers may translate the nicknames into the actual IP addresses or prefixes using a mapping. Unfortunately, retrieving the mapping and performing the translation may be time consuming and may impede network convergence time. Further, it may increase the complexity of LDP sessions, especially when an MPLS label needs to be exchanged between non-adjacent peers due to a link or node failure. Thus, using the nicknames as labels in MPLS, instead of actual addresses, may negatively impact network performance and convergence.

DESCRIPTION OF EXAMPLE EMBODIMENTS

Figure 1:
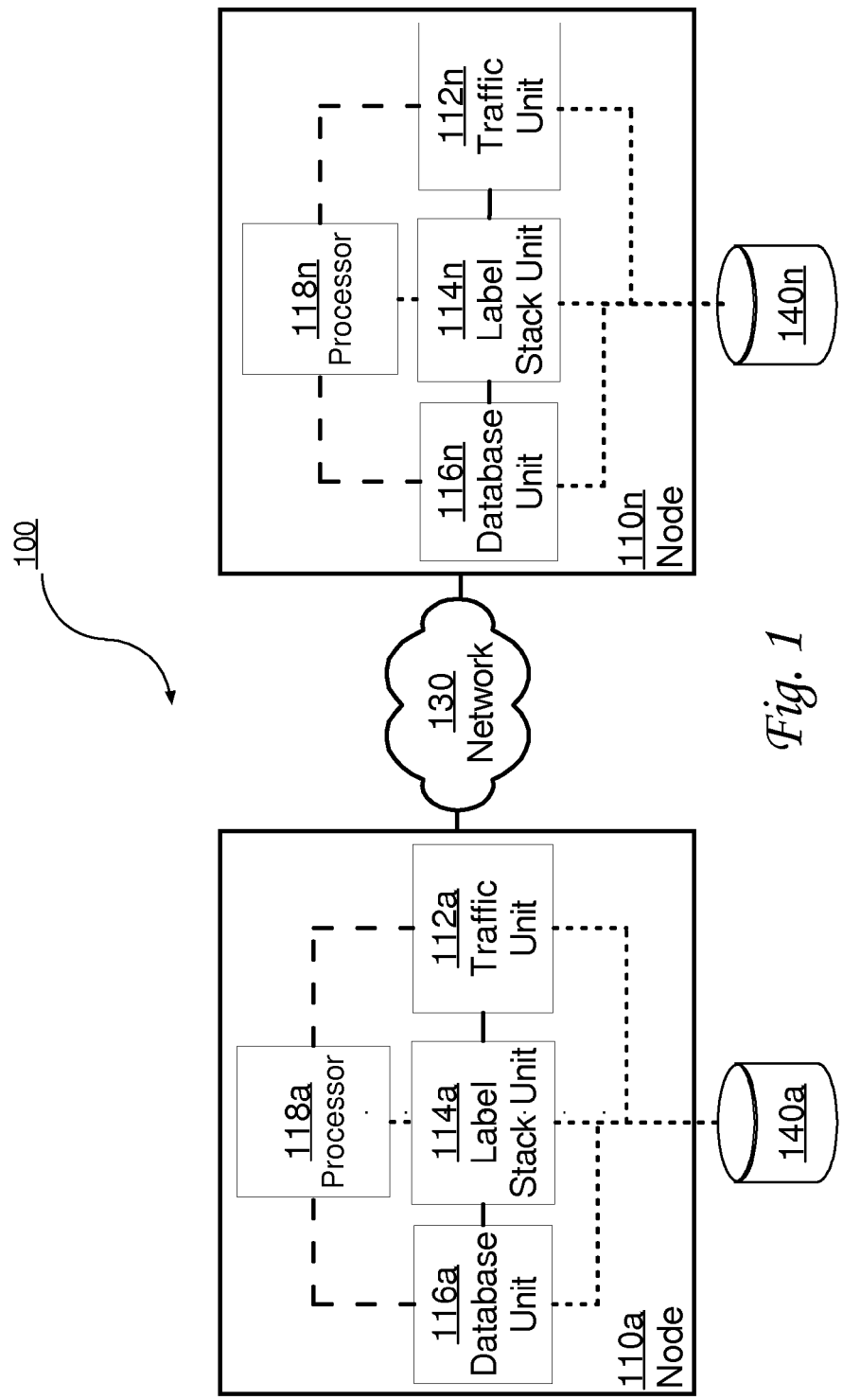
FIG. 1 illustrates an example system implementing large label stack entries.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 Overview
2.0 Structural and Functional Overview
3.0 Large Label Stack Entry
4.0 Protocol Specific Considerations
5.0 Processing Large Label Stack Entry
6.0 Large Label Stack Entry Modifiers
7.0 Implementation Mechanisms—Hardware Overview
8.0 Extensions and Alternatives

1.0 Overview

A method for defining and using large universal labels in MPLS packets is presented.

The appended claims may serve as a summary of the invention.

In an embodiment, a method comprises receiving a data communications packet comprising one or more labels in a label stack, and determining whether a table identifier is present in the label stack. In response to determining that the table identifier is present in the label stack: based, at least in part, on the table identifier, a label table is determined. Also, a next hop for the data communications packet is determined by performing a next-hop lookup in the label table using at least one of the one or more labels. Then, the data communications packet to the next hop is forwarded.

In an embodiment, determining the next hop for the data communications packet further comprises determining whether an end-of-ministack modifier is set in the label stack. In response to determining that the end-of-ministack modifier is set in the label stack, the next-hop lookup in the label table is performed using two or more labels from the label stack.

In an embodiment, determining the next hop for the data communications packet further comprises determining whether a prefix modifier is set in the label stack. In response to determining that the prefix modifier is set in the label stack, the next-hop lookup in the label table is performed by determining a longest match between the one or more labels from the label stack and entries in the label table.

In an embodiment, the method further comprises: in response to determining that the table identifier is not present in the label stack: determining a default table; determining the next hop for the data communications packet by performing the next-hop lookup in the default table using a first label from the label stack; and forwarding the data communications packet to the next hop.

In an embodiment, the method further comprises determining whether an expanded traffic class modifier is set in the label stack. In response to determining that the expanded traffic class modifier is set in the label stack, it is determined that a payload of the data communications packet comprises a type-of-service message associated with the data communications packet.

In an embodiment, the method further comprises determining whether an operation-administration-maintenance (OAM) modifier is set in the label stack. In response to determining that the OAM modifier is set in the label stack, determining that a payload of the data communications packet comprises an OAM message associated with the data communications packet.

In an embodiment, the one or more labels in the label stack have variable lengths, specified by a respective label length parameter included in the label stack.

In an embodiment, a method is performed by one or more computing devices.

The foregoing and other features and aspects of the disclosure will become more readily apparent from the following detailed description of various embodiments.

2.0 Structural and Functional Overview

FIG. 1 illustrates an example system 100 implementing large label stack entries. The system 100 comprises a plurality of nodes 110a, 110n, and one or more networks 130. Nodes 110a, 110n are communicatively coupled with each (or some) other via network 130. Nodes 110a, 110n are also communicatively coupled with their respective databases 140a, 140n.

Nodes 110a, 110n may be network infrastructure elements in a distributed environment. As used herein, a network infrastructure element refers to a networking device that is operable to manage network traffic transmitted in one or more networks. Typically, a network infrastructure element is operable to receive packet flows on network interfaces connected to other network infrastructure elements, make a routing or forwarding decision regarding the received packet flows, and transmit the received packet flows on the network interfaces based on the decision. Examples of network infrastructure elements include, but are not limited to, routers, switches, bridges and hubs. For simplicity, the network infrastructure elements may be referred to herein as nodes.

For the purpose of illustrating clear examples, FIG. 1 shows two (2) nodes 110a and 110n. However, the embodiments may use any number of nodes 110a, 110n, as implied by the label n used for node 110n. Furthermore, for the purpose of illustrating clear examples, FIG. 1, shows that node 110a communicates with node 110n via a network 130. However, in other embodiments, some nodes may communicate with each other directly, some other nodes may communicate with each other via a plurality of networks 130, and yet other nodes may communicate with each other via other devices, such as routers, switches or hubs. Moreover, FIG. 1 shows that each node 110a, 110n is communicatively coupled with its own database 140a, 140n, respectively. However, in some embodiments, nodes 110a, 110n may have access to a shared database, a distributed database system, or other type of a database.

Nodes 110a, 110n may be implemented in a variety of devices, including switches, routers, hubs and other devices commercially available from Cisco Systems, Inc., San Jose, Calif.

In an embodiment, nodes 110a, 110n comprise various processing units or other internal functional units. In the description below, the specific units are described in reference to a node 110a; however, the same or similar modules may be identified in nodes 110a, 110n.

In an embodiment, node 110a comprises a traffic unit 112a, a label stack unit 114a, a database unit 116a and one or more processors 118a. Node 110a may also comprise additional modules not identified above. For example, node 110a may comprise other components such as an operating system (OS) module, a plurality of network interfaces, and other components that are operable to facilitate routing and/or forwarding functionality.

In an embodiment, a traffic unit 112a, a label stack unit 114a, a database unit 116a and a processor 118a may be implemented as one or more software and/or hardware components that are executable under the control of an operating system (OS) of a node. For example, a traffic unit 112a, a label stack unit 114a, a database unit 116a and a processor 118a may be implemented as one or more software components, or as any combination of hardware and software components.

A traffic unit 112a may be configured to receive data communications for other nodes in system 100, process the data communications and forward the data communications toward destinations. Traffic unit 112a may implement any type of data communications protocol, including MPLS, IP, TCP, BGP and others. In an embodiment, traffic unit 112a implements MPLS.

A traffic unit 112a may also be configured to receive routing information in a form of an advertisement. Once a node 110a receives an advertisement, traffic unit 112a, implemented in the node, may cooperate with other units to update routing tables maintained by the node and user information from the routing tables to forward data.

A traffic unit 112a may further be configured to receive data packets from other nodes. Upon receiving a data packet, the traffic unit 112a may store the data packet in a database unit 116a, determine whether the received data packet should be forwarded and/or cooperate with a label stack unit 114a to determine a destination for the packet.

A label stack unit 114a may be configured to implement a processing of a large label stack entry included in a data packet. For example, the label stack unit 114a may be configured to extract a large label from the received data packet, determine whether the extracted large label needs to be in any way modified, modify the large label if needed, use the modified large label to determine a next hop for the received packet, and return the next hop information to the traffic unit 112a for the traffic unit 112a to forward the received packet toward the destination.

A database unit 116a may be configured to store information in a database 140a. Furthermore, database unit 116a may be configured to search the information stored in the database 140a, and to retrieve the information from the database 140a. Database unit 116a may be configured as a distributed storage system, a relational database storage system, or any other data storage device known in the industry.

Furthermore, a database unit 116 may be configured to retrieve routing data for transmitting data between nodes in system 100. For example, a database unit 116 may retrieve the routing information from forwarding information tables (FIBs) and routing information tables (RIBs) that a traffic unit 112a may use to forward the received data packets toward their destination.

A processor 118a may be configured to execute commands and instructions for implementing roles or functions assigned to a node. For example, processor 118a may facilitate communications to and from the node 110a, process commands received by and executed by the node 110a, process responses received by the node 110a, and facilitate various types of operations executed by the node 110a. Processor 118a may comprise hardware and software logic configured to execute various processes on the switch, and use hardware logic such as in an application-specific integrated circuit (ASIC), field-programmable gate array (FPGA), system-on-a-chip (SoC) or other combinations of hardware, firmware and/or software.

A database 140a may be configured to store information and communicate with a database unit 116a, as described above. Database 140a may be configured as a distributed storage system, a relational database storage system, or any other data storage device known in the industry.

3.0 Large Label Stack Entry

In MPLS, a packet received by a node usually contains information about a destination to which the packet is intended. Upon receiving the packet, the node uses the destination information and various mappings to determine a next-hop, to which the node may forward the packet to move the packet closer to the destination. Once the node determines the next-hop, the node may encode the next-hop information in the packet and transmit the packet to an output port. The next-hop information may be represented by a next-hop label. The next-hop label may be encoded in one of the fields of the packet. The encoding is usually explicit. For example, in MPLS, the label may be represented by a nickname, and LDP may use the label table information and a mapping to determine a next-hop IP address or prefix. However, using the nicknames in the label stack entries, as in the conventional MPLS, may be in many aspects inflexible and undesirable.

Embodiments provide an approach for representing the labels in a label stack entry in a more flexible and efficient way than it is possible using a conventional approach.

In an embodiment, the approach utilizes an encoding of a label table to be used in the label and avoids label clashes between competing control planes identifiers such as MPLS Labels (corresponding to a Multiprotocol Label Switching label identifier), IP Add (corresponding to an Internet Protocol address identifier), MAC Add (corresponding to a Media Access Control address identifier), or VPN identifiers (corresponding to Virtual Private Network identifiers).

In an embodiment, a size of a label field in a label stack entry of a packet is larger than a conventional label field and is termed a large label stack entry. The label stored in a large label stack entry of a packet is referred to herein as a large label.

Increasing a size of the label field in a label stack entry in a packet allows extending an address space for label tables. Further, by performing a long-size-label-table match within the label table space it is possible to identify a particular control plane explicitly using the label encapsulated in a data packet. Identifying the control plane directly from the label is more efficient than identifying the control plane using a short nickname and then determining the actual control plane from a mapping for the nicknames.

In an embodiment, communicating label table information using a large label approach provides improvements in network convergence time. In the large label approach, a control plane of a node is merely converged to a control protocol. In contrast, with a conventional approach, a control plane of a node would have to be converged to the control protocol and then to the nickname protocol. The large label approach allows simplifying the control plane convergence process at a node, and hence, shortens the convergence time of the network.

Further, the large label approach may improve network convergence after network troubleshooting and repairs. For example, if there is a need to perform repairs of a node or a link in a network, and for that purpose means such as Resource Reservation Protocol—Traffic Engineering (RSVP-TE) or remote Load Flow Applications (LFA) are invoked, then using IP addresses as labels, instead of a 20-bit-long MPLS nickname-label, avoids the need to establish and maintain a Targeted Label Distribution Protocol (T-LDP) session. Subsequently, additional state information does not have to be distributed and stored, and thus, the network may converge faster.

Moreover, a large label approach may allow distributing context information within a label stack of a packet, which is typically disallowed in conventional approaches. By allowing a large label to be extensible by nesting one label stack within another label stack, the instructions or context in the label stack can be transmitted within the label stack.

In an embodiment, a large label approach is implemented in an MPLS (Request For Comments (RFC) 3032) type of label stack encapsulation. In this implementation, a large label stack includes an indicator of label table space that is indexed by a large label, and the encapsulation of the label large accommodates IPv4 addresses as well as IPv6 address.

Figure 2A:
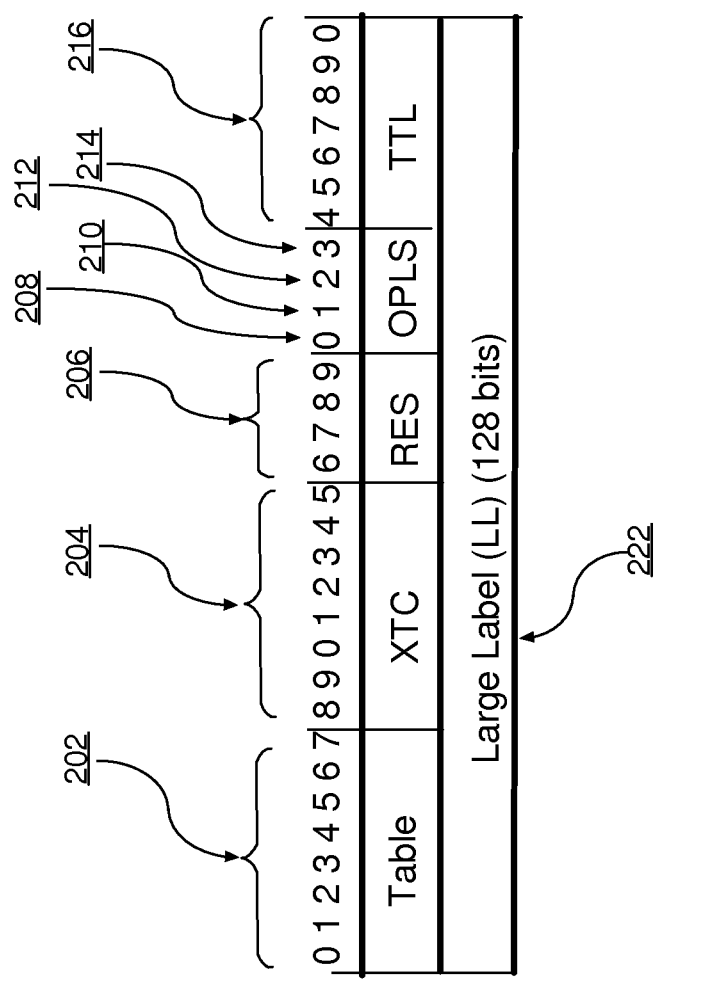
FIG. 2A illustrates an example large label stack entry.

FIG. 2A illustrates an example large label stack entry (LLSE). In FIG. 2A, a field 202 is used to store a label table identifier, a field 204 is used to store an expanded traffic class (XTC), a field 206 is reserved for future use (RES), a bit 208 indicates that a payload that follows the label stack is an OAM message, a bit 210 is a prefix indicator, a bit 212 is a little S (end of a ministack), a bit 214 is an end of stack S indicator, a field 216 is used to store a hop count of time to live (TTL), and a field 222 is used to store a large label (LL). The types of the fields and their respective sizes may vary and may depend on the implementation. For example, the field sizes may be determined keeping in mind the maximum size of the large label stack entry. Also in the large label stack entries, the order of the fields or the bits in various fields may be modified.

In an embodiment, a field 202 identifies a label table in which a LL is to be looked up. In some implementations, the field 202 comprises eight (8) bits; however, in future implementations, the size of field 202 may be changed. Furthermore, the order of the bits in the field 202 may be reversed. A label table is a table in which next-hop information is stored. The next-hop information is used to forward a received packet toward the packet's destination.

In an embodiment, a field 204 indicates an expanded traffic class, and it is usually large enough to carry an IP Type-of-Service. For example, the field 204 may be used to carry packet classification information, priority values for the packet, congestion control information, non-congestion control traffic information and other traffic-related information.

In an embodiment, a field 206 is reserved for future use, and is referred to herein as a RES field. Initially, the field 206 may be initialized to all zeroes. The size of the field 206 and the bit order in the field 206 may depend on the implementation.

In an embodiment, a bit 208 indicates whether a payload that follows the label stack is any of OAM messages. OAM provides a framework for monitoring network operations. OAM messages may be used to detect network faults, measure network performance, and distribute various, fault-related information.

In an embodiment, a bit 210 indicates whether the LL is to be treated as a prefix and whether the operation associated with the longest match between the LL and the entries in a label table is to be carried out. The bit 210, also referred to as bit "P," is new, and if it is set to "1," it may be used to instruct the forwarder to look up the LL as the longest prefix match. Otherwise (if it is set to "0"), then it may be used to instruct the forwarded to lookup the LL as the exact IP address match.

In an embodiment, a bit 212, also referred herein as a bit "L," or "S" bit, corresponds to a Little S bit, or an "End-of-Ministack" indicator. It indicates whether the LL is an incomplete label. For example, if the little S bit is set to "0," then it indicates that the LL is an incomplete label and that the label processing operation may involve the contents of the label in the next large label stack entry to complete the operation. If the little S is set to "1," then it indicates that the LL present in the current large label stack entry is either the only portion of the LL or the last portion of the LL needed for determining a next-hop for the packet forwarding.

In an embodiment, a bit 214 indicates an end of stack bit, and has the same semantics as in RFC3032.

In an embodiment, a field 216 indicates a hop count, also referred to herein as time to live (TTL). TTL is a mechanism for limiting a life span or lifetime of data in a computer network. TTL prevents a data packet from circulating indefinitely. A TTL field 216 may be set by a sender of a data packet and reduced by every router along the route from the sender to a packet destination. The size of the field 216 and the bit order in the field 216 may depend on the implementation. If the TTL field reaches "0" before the packet reaches the destination, then the packed may be discarded and an error message may be generated. Therefore, if a node receives the packet with the TTL field set to "1," the node may discard the packet and forgo the LL processing.

Encoding of an LL may vary. In an embodiment depicted in FIG. 2A, a large label 222 is a 128-bit-long label. Upon receiving a packet with a LLSE having a 128-bit-long LL, a packet receiving node may extract the LL, and use the LL to determine a next-hop to which the received packet should be forwarded. The process of using the LL to determine the next-hop is described in FIG. 3.

Figure 2B:
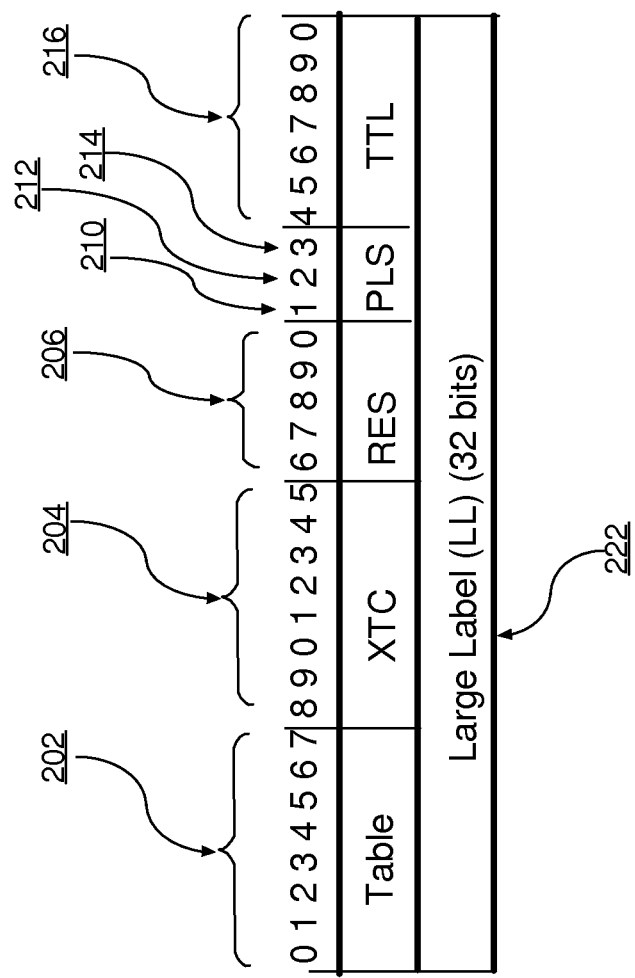
FIG. 2B illustrates an example large label stack entry.

In another embodiment, a large label is a 32-bit-long label. However, even if only 32 bits are dedicated in an LLSE to an LL, there are ways of encoding the LL using additional LLSE or fields in the LLSE to represent the LL using more than 32 bits. For example, a Little-S/ministack mechanism may be used to facilitate usage of larger labels. For instance, if the little-S flag is set to "0," then a node will attempt to combine a portion of the LL from the current LLSE with one or more portions from next LLSE(s) to generate a resulting large label. Using this method, the approach for LL may be extended to accommodate IPv6 addresses. An example of an LLSE with a 32-bit-long LL is depicted in FIG. 2B, and described in detail below.

Figure 2C:
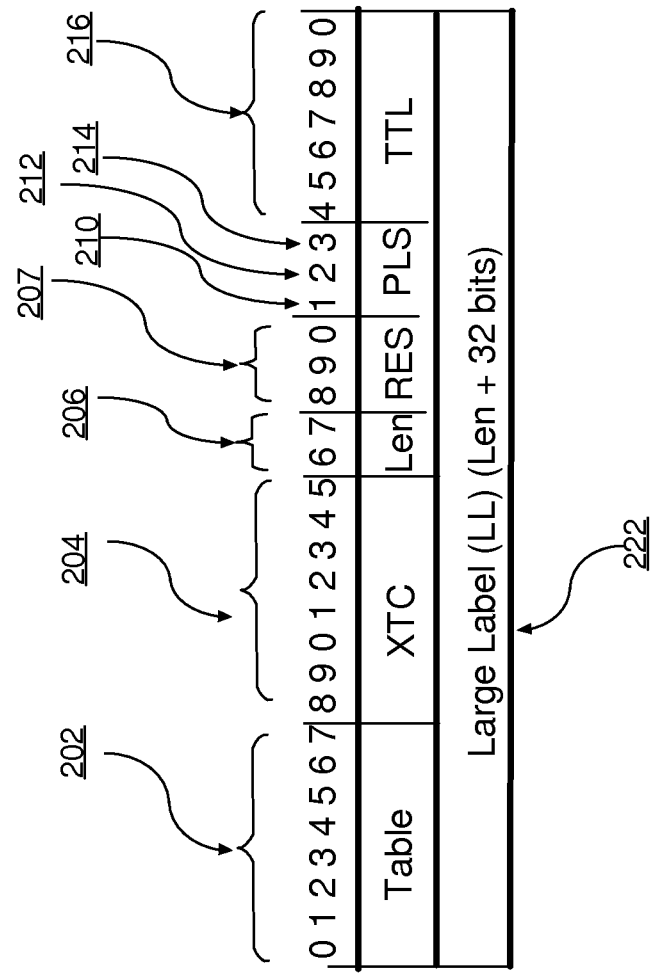
FIG. 2C illustrates an example large label stack entry.

Alternatively, an LL field may have a variable length, and an additional field, such as an LL length field, may be introduced and used to indicate the length of the LL label in a LLSE. This approach seems to be a rather flexible approach; however, it may present some difficulties in hardware implementation. An example of an LLSE with a 32-bit-long LL is depicted in FIG. 2C, and described in detail below.

In an embodiment, an LL is used to determine a next-hop to which a received packet may be forwarded to eventually reach a packet destination. Determining the next-hop may utilize a mapping supported by MPLS. RFC3032 MPLS can be mapped in several ways. For example, RCF3032 MPLS may be mapped as a part of extended MPLS, or by assigning a label table a table number and providing a standard mapping, utilizing high order bits set to zero. Extended MPLS may use a 128-bit label, and allow the peers to negotiate an upper bound of the assigned labels. The methods of negotiation are outside the scope of this description.

In an embodiment, extended MPLS may include a sizable storage capacity for storing a significant quantity of reserved labels, and subsequently, to eliminate the possibility of exhausting the label space, which could happen in RFC 3032 MPLS.

In an embodiment, it might be preferable to map both RFC 3032 MPLS and extended MPLS into a single label space. That could be accomplished a number of ways, such as allocating the 0 . . . 1,048,575 label values to RFC 3032 MPLS, and then mapping the extended reserved label space to another location, such as the top 64K of label space. In either case two tables may be used, one of which may be used for an upstream label assignment and another for a downstream label assignment. This distinction could be made out of band through the use of Ethertype, through the use of the table identifier, or through both.

Mapping an IPv6 host address to an LL may be straightforward; however, mapping a prefix to an LL may be rather complex. A P(refix) bit in the LLSE may instruct the forwarder to do a prefix (longest match) lookup on the LL rather than the traditional full match, which is normally associated with a LL lookup. However, if it is known that a single prefix length may be used by all P routers that will forward the packet, then a prefix may be placed in the LL and the P bit may be left clear. In contrast, IPv4 may be mapped into its own table or into the IPv6 table through the use of a well-known prefix.

In service provider and content distribution (CD) networks, Ethernet paths may be set using an out of band mechanism. For example, a 128-bit-long LL may have a sufficient space to carry 2*48 bit MAC addresses+2*12 bit tags with 8 spare bits. This may be sufficient to carry a single layer in a layered Ethernet system to allow either a control plane or an address-learned system to be carried. Further, if it is needed, additional layering information could be carried in other LLSEs. Alternatively, additional layering information may be carried through the little S bit mini-stack mechanism.

In an embodiment, opaque instructions may be mapped into the MPLS label space or may be stored in a single table. To some extent, this may be conceptually equivalent to the way that pseudo-wire or VPN terminations are mapped into the MPLS label space after the initial design of MPLS.

In an embodiment, a large label approach allows constructing arbitrary label stacks which retain the unique ability of MPLS to incorporate opaque instructions while retaining support for many of the existing control plane protocols. For example, the approach allows a single stack to contain a mixture of identifiers of local significance, identifiers of global significance, and identifiers of opaque instructions. This may be illustrated using the following example. Assume that in a VPN network span over MPLS, Fast Reroute (FRR) for node failure is requested. This may be accomplished by using an IP address in place of the FRR label in a data packed. In particular, the FRR targeted LDP may be eliminated, and by using an IP address in place of the PE address, the LDP in the MPLS domain may be eliminated. Among other benefits, this approach will for example, speed up the network convergence. Although the same could have been accomplished used the nested IP encapsulation method, the LLSE approach seems to be more compact than an IP header approach, and may retain the layered security model of MPLS and the opaque instruction model of MPLS.

4.0 Protocol Specific Considerations

In an embodiment, using a large label approach to support IPv6 may be problematic because of the maximum transmission unit (MTU) requirements and limitations, label table space limitations and other issues. Although most service provider networks only use IPv4 for internal addresses, and hence, most applications that are compatible with IPv4 can accommodate 32-bit-long labels as the longest large labels, the networks that use IPv6, the 32-bit-long large label may be insufficient.

In an embodiment, the large label approach may be extended and modified to support IPv6. For example, it may be assumed that a default large label size is reduced to 32 bits; however, if the size of the label needs to be increased, then a flag may be set to indicate that. For example, if the size of a particular label does not exceed 32 bits, then the particular label may be communicated in a conventional IPv4 packet, and no label size extension is required. However, if the size of the particular label exceeds 32 bits, and is, for example, 40 bits, then a particular flag may be set to indicate that the particular label is communicated in two (or more) large label fields.

In an embodiment, a flag used to implement the large label approach in IPv4 may correspond to a "little S" flag in a packet. If in a particular packet, the little S flag is set, then the particular packet carries portions of the large label in two or more LL fields.

FIG. 2B illustrates an example large label stack entry (LLSE). In FIG. 2B, a field 202 is used to store a label table identifier, a field 204 is used to store expanded traffic class (XTC), a field 206 may be reserved for future use (RES), a bit 210 is a prefix indicator, a bit 212 is a little S (end of ministack), a bit 213 is an end of stack S indicator, a field 216 is used to store a hop count, and a field 222 is used to store a large label (LL). If the 32-bit-long field 222 is not sufficient to represent a particular large label, then a flag L 212 may be set to indicate that the information stored in the large label field 222 contains only a portion of the particular large label, and that one or more additional packets carry the remaining portions of the particular large label. Sizes of the depicted fields and bit orders in the fields may depend on the implementation.

One of the benefits of the approach depicted in FIG. 2B is that conventional LSE packets are usually the same constant length, and thus, LLSE in which the flag L is set to "0" may correspond to a conventional LSE. However, one of the disadvantages of the approach is that expressing for example a 128-bit-long large label takes 256 bits of a total label stack.

In an embodiment, an alternative method for extending the large label approach to support IPv6 is presented. In this approach, a packet contains information indicating the size of the large label, and thus the approach makes a more efficient use of the packet MTU, and the packet processing resources. Instead of assuming that a maximum size of a large label is either 32 bits or n*32 bits, the length of an individual packet may be expressly indicated in the packet.

FIG. 2C illustrates an example large label stack entry (LLSE). Fields 202, 204, 210, 212, 214, 216 and 222 in FIG. 2C correspond to the respective fields in FIG. 2B. However, the five bits of field 206 of FIG. 2B, in FIG. 2C are divided into two separate fields 206 and 207. A field Len 206 includes two bits, and is dedicated for storing a large label length, while a field RES 207 includes three bits, and is reserved for future use.

In an embodiment, an actual size of a particular large label is stored in a field Len 206. The Len may represent a multiplier of 32-bit-long large label segments. For example, if a size of a particular large label is 64 bits, then a 32-bit-long field 222 is not sufficient to represent the entire particular large label. However, storing a value of "1" in the Len Field 206 may indicate that actual size of the particular large label does not exceed 32+1*32, and that two LL fields are used to store the entire particular large label. The Len may be set to indicate that the information stored in the large label field 222 contains only a portion of the particular large label, and that one or more additional packets carry the remaining portions of the particular large label.

In an embodiment, in this approach, an LLSE may be short enough so that a large label field 222 may be adopted to carry both, a 32-bit IPv4 address and 64-bit IPv6 address. This approach seems to be flexible and efficient for a variety of reasons. However, introducing a variable length of LLSE (Len field 206) imposes a rather essential change from the MPLS concept of constant sized LSEs.

In an embodiment, other approaches for extending the large label approach to support IPv6 are contemplated. For example, there may be a method for supporting any size of the large label as long as the size is within the [32-bits, 128-bits] range using extensions to MPLS and/or other protocols.

Further, by implementing a nonce approach and cryptographic signature method to process the data of the stack, the authentication of the packets carrying large labels may be implemented. The solution for representing a variable length may depend on whether a large label size is represented in 32-bit-long units, or in units smaller than 32-bits, or some variable-length units.

5.0 Processing a Large Label Stack Entry

Figure 3:
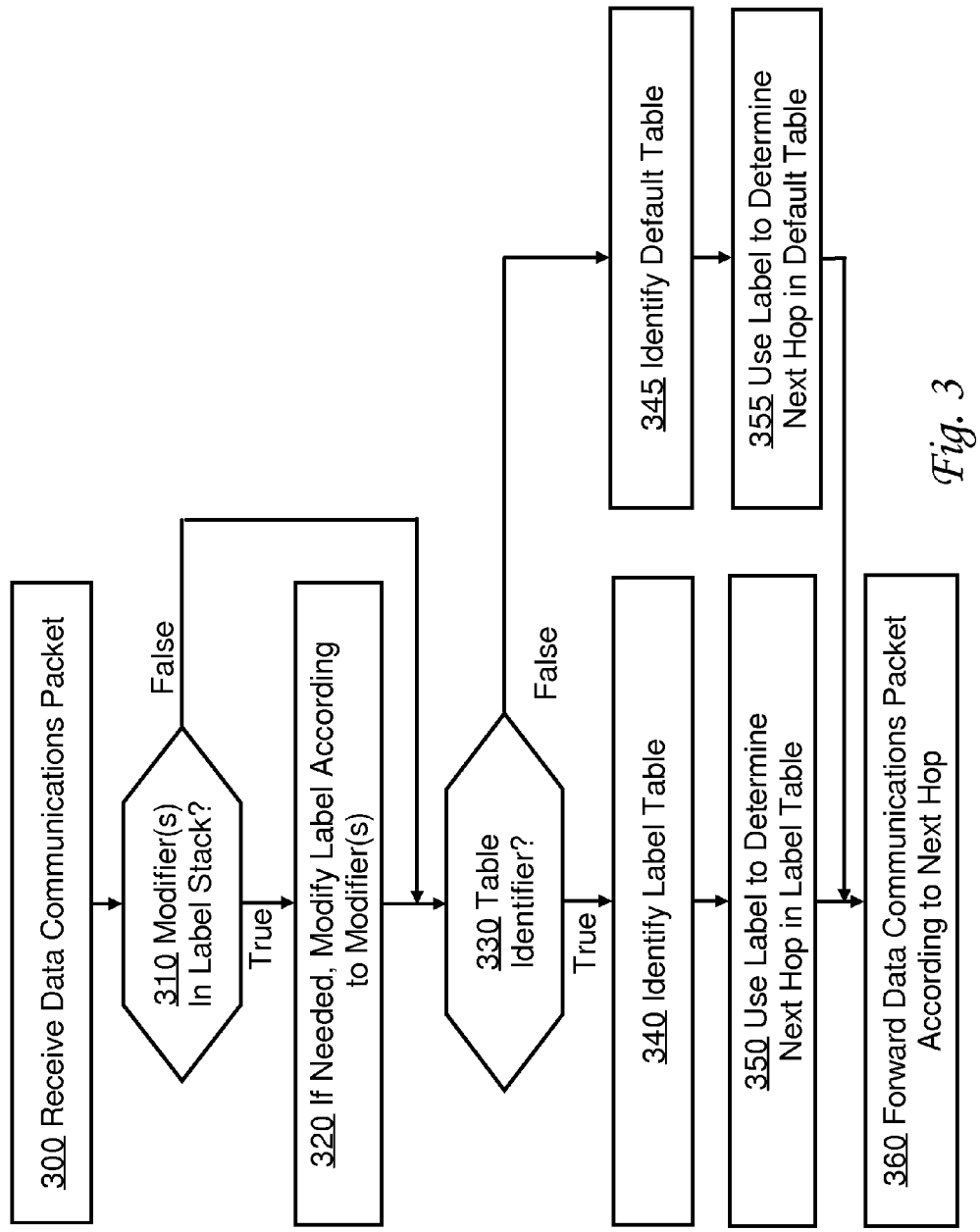
FIG. 3 illustrates an example method for processing large label stack entry.

FIG. 3 illustrates an example method for processing large label stack entry. In step 300, a node receives a data communications packet. The packet may comprise one or more LLSEs, and the LLSEs may be represented in a variety of formats, including any of the formats depicted in FIG. 2A, FIG. 2B, FIG. 2C.

In step 310, the process determines whether any of modifiers are set in the label stack of the received data communications packet. A modifier is a flag or a code that may be included at a certain location in the packet, and may indicate additional attributes of the packet or comprise additional instructions for the packet processing.

In an embodiment, one or more modifiers may be included in a received packet. The modifiers may be included in certain fields of the received packet, and may be represented by alphanumeric codes encoded using multi-bits fields. For example, the modifiers' fields may occupy certain bits of a first, second and third octet of the received packet. Some of the modifiers' fields are described in FIG. 2A, FIG. 2B, FIG. 2C.

Non-limiting examples of the modifiers include an end-of-ministack modifier, a prefix modifier, an expanded traffic class modifier, an OAM modifier, a time-to-live modifier, a large label modifier, and a prefix modifier. For example, if the label stack comprises an end-of-ministack modifier set to "0," then the modifier indicates that a label included in the label stack is an incomplete label, and to derive a complete label, one or more label data from one or more label entries in the label stack need to concatenated, or otherwise processed. However, if the label stack comprises an end-of-ministack modifier set to "1," then the modifier indicates that a label included in the label stack is a complete label, or that the already concatenated labels, derived from previously identified label stack entries form a complete label. Additional details pertaining to the modifiers and label processing based on the content of the modifiers are described in FIG. 4, below.

If in step 310, it is determined that one or more modifiers are set in the label stack, then in step 320, the determined modifiers are used to modify one or more labels in the label stack. For example, if it was determined that an end-of ministack modifier is set to "1," then either a label included in the label stack is a complete label, or that the already concatenated labels, derived from previously identified label stack entries, is the complete label. Additional examples of label processing, based on various modifiers, are described in FIG. 4, below.

In step 330, a process determines whether a table identifier is present in the label stack. If the table identifier is present in the label stack, then the process proceeds to step 340, in which, using the table identifier, a label table is identified. Then, the process proceeds to step 350, in which, using the label table, the label table is retrieved. Then, using the label table determined in step 350 and label determined in step 320, an entry in the label table is identified and a next hop data is extracted from the label table.

However, if in step 330, it is determined that no table identifier is present in the label stack, then the process proceeds to step 345, in which a default table is identified. A default table is a table whose location is known to a node and which can be identified by the node even if the table identifier is not provided. Then, in step 355, the process retrieves the default table, and, using the label determined in step 320, an entry in the label table is identified and a next hop data is extracted from the label table.

In step 360, the data communications packet is forwarded according to the next hop information. Whether the next hop is determined using a particular label table or a default table, the next hop indicates to the node where to the received data communications packet should be forwarded. The ability to use any label table and the ability to address the label table using a large label having a variable size extends the label table addressability and provides extensibility to next-hop address space.

6.0 Large Label Stack Entry Modifiers

Figure 4:
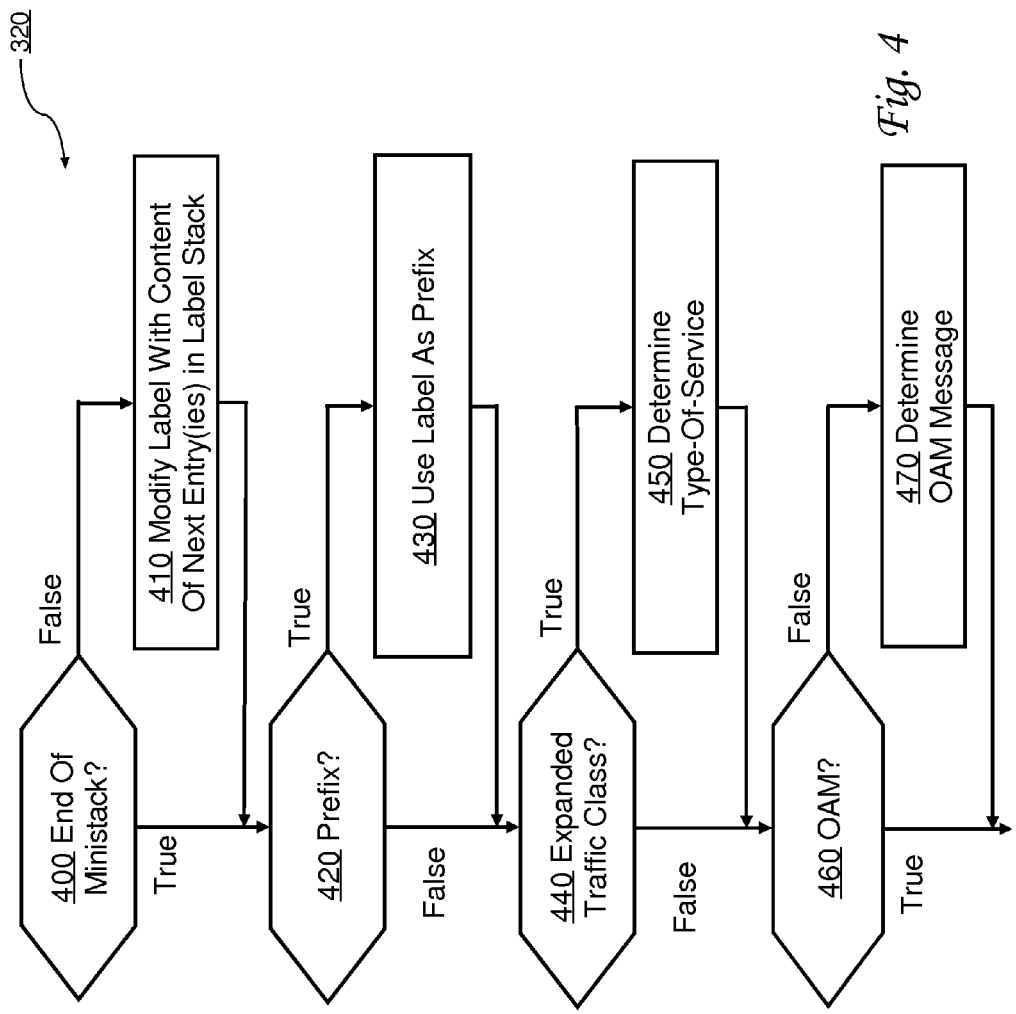
FIG. 4 illustrates an example method for modifying large label stack entry.

FIG. 4 illustrates an example method for modifying large label stack entry. The steps depicted in FIG. 4 may server as a detail description of step 320 of FIG. 3. The steps depicted in FIG. 4 are merely examples of many ways in which a large label stack entry may be modified or the ways in which a received data packet may be modified or processed.

In step 400, it is determined whether a bit "Little S" (end of a ministack) bit is set in a received data packet. If the little S bit is set to "1," then it indicates that a large label in the LLSE is a complete label, or that the label obtained by concatenating portions from respective LLSEs is the resulting large label. If the little S bit is set to "1," then the process proceeds to step 420.

However, if the little S bit is set to "0," then it indicates that a large label in the LLSE is an incomplete label, and that the label processing operation may include combining the large label from the current LLSE and one or more large labels from one or more additional LLSE(s) to derive the complete large label. For example, if it was determined that an end-of-ministack modifier is set to "1," then either a label included in the label stack is a complete label, or that the already concatenated labels, derived from previously identified label stack entries, is the complete label. Hence, if a label stack comprises one label stack entry, the label stack entry comprises one label and an end-of-ministack modifier is set to "1," then the end-of-ministack modifier indicates that the label included in the label stack entry is a complete label, and no modification to the label is required. However, if a label stack comprises two label stack entry, and an end-of-ministack modifier is set to "1," then the first label entry comprises a first portion of the label, the second label entry comprises a second portion of the label, and the portions may be concatenated to produce the resulting label. Therefore, the process proceeds to step 410, in which a large label entry is extracted from the LLSE, and one or more large labels are extracted from the one or more additional LLSE(s) to derive the complete large label.

In step 420, it is determined whether a bit "Prefix" is set in a received data packet. In some implementations, the bit "Prefix" may be ignored, in others, if the bit "Prefix" is set, then it indicates to a packet forwarder that a large label included in an LLSE is a prefix and the subsequent longest match may be performed based on the prefix match, not as an exact IP address match. If the "Prefix" bit is set, then in step 430, the process instructs the node forwarder to use the large label as a prefix in the large label matching.

In step 440, it is determined whether a bit "Expanded Traffic Class" is set in a LLSE. A traffic classification is a process which categorizes computer network traffic according to various parameters, such as a device port number or a communications protocol, into a set of traffic classes. A class within the set may be characterized by specific bandwidth requirements, rate limits, priorities and other characteristics. For example, VoIP traffic may be considered as sensitive traffic and may prefer special quality of service settings, while email-generated traffic may be considered as less-demanding, best-effort traffic.

If the bit "Expanded Traffic Class" is set, then in step 450, a type of required service for the packet is determined and the process instructs the node forwarder about the identified type of the required service for the packet. However, if the bit "Expanded Traffic Class" is not set, then the process proceeds to step 460.

In step 460, it is determined whether a bit "OAM" is set in a received data packet. If the bit "OAM" is set, then it indicates that a payload that follows the LLSE is an OAM message. OAM generally refers to processes, activities, tools and standards involved with operating, administering, managing, and maintaining a network and network elements. OAM may include monitoring and troubleshooting the network, network elements and inter-element connectivity. A network element may implement several different OAM techniques for connectivity fault management, link layer discovery, or data plane fault testing. Some of such techniques may include transmitting keepalive messages to another network element and receiving keepalive messages from other network elements.

If the bit "OAM" is set in the LLSE, then in step 470, an OAM message is extracted from the received packet, and the packed forwarder is instructed about the type of the OAM processing that is requested.

In an embodiment, other methods for LLSE modifications or data packet processing may be determined. For example, if an LLSE comprises a large label length field, then the value stored in the large label length field may be extracted and used to determine an actual length of a large label field, from which the large label may be extracted.

7.0 Implementation Mechanisms

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
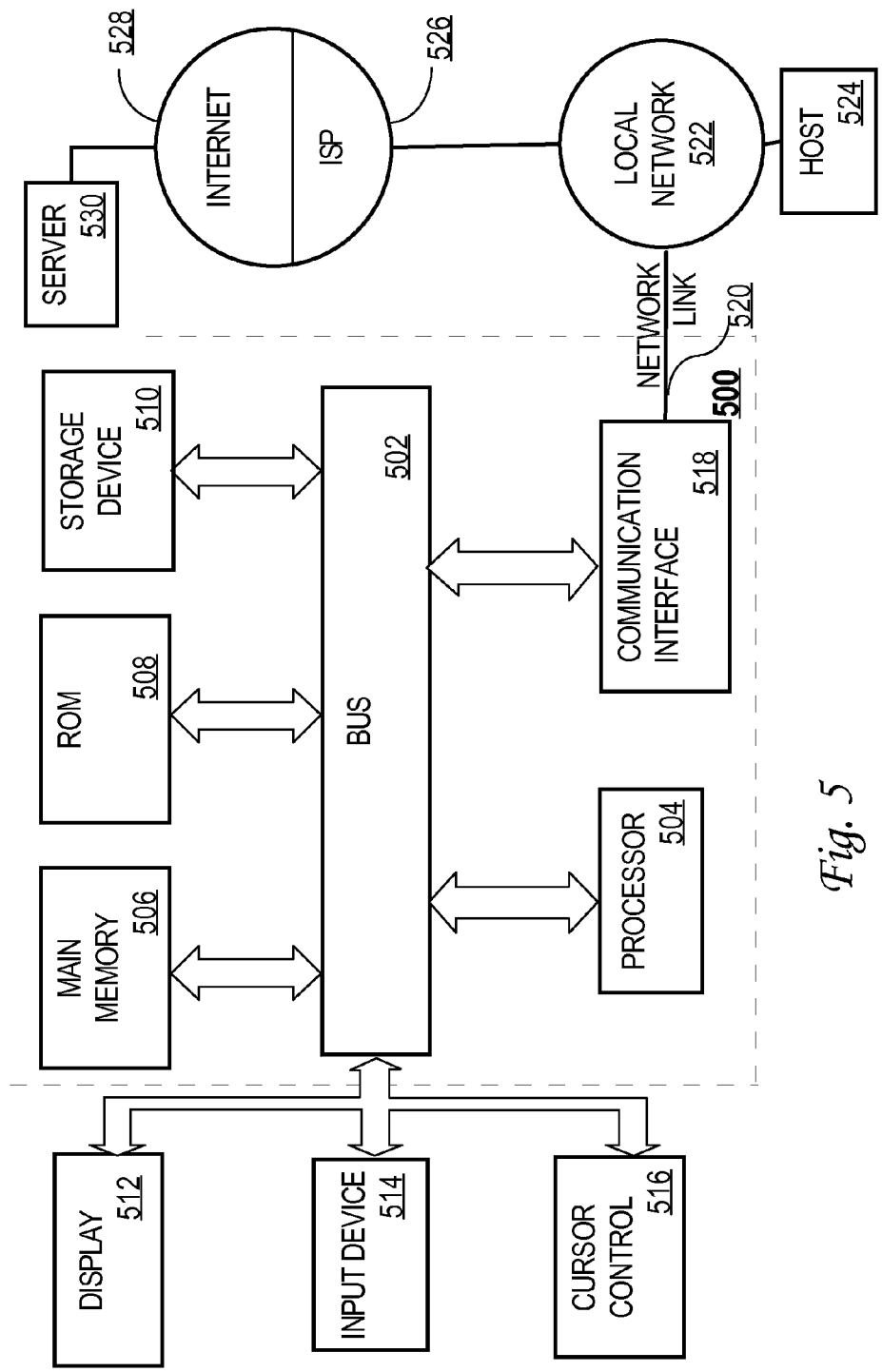
FIG. 5 illustrates an example computer system with which an embodiment may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (LCD, CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8.0 Extensions and Alternatives

In the foregoing specification, embodiments of the invention have been described with reference to numerous specific details that may vary from implementation to implementation. The specification and drawings are, accordingly, to be regarded in an illustrative rather than a restrictive sense.

What is claimed is:

1. A method comprising:
receiving a data communications packet comprising one or more labels in a Multiprotocol Label Switching (MPLS) label stack;
determining whether a table identifier is present in the MPLS label stack;
wherein the table identifier identifies a label table in which next-hop information for the data communications packet is stored and which is indexed using at least the one or more labels included in the MPLS label stack of the data communications packet;
in response to determining that the table identifier is present in the MPLS label stack:
based, at least in part, on the table identifier, determining the label table; determining a next hop for the data communications packet by performing a next-hop lookup in the label table using at least one of the one or more labels; and
forwarding the data communications packet to the next hop; and wherein the method is performed by one or more computing devices.

2. The method of claim 1, wherein determining the next hop for the data communications packet further comprises:
determining whether an end-of-ministack modifier is set in the MPLS label stack;
in response to determining that the end-of-ministack modifier is set in the MPLS label stack, performing the next-hop lookup in the label table using two or more labels from the MPLS label stack.

3. The method of claim 1, wherein determining the next hop for the data communications packet further comprises:
determining whether a prefix modifier is set in the MPLS label stack;
in response to determining that the prefix modifier is set in the MPLS label stack:
determining whether the one or more labels from the MPLS label stack are longer than entries in the label table;
in response to determining that the one or more labels from the MPLS label stack are longer than the entries in the label table, performing the next-hop lookup in the label table, performing the next-hop lookup in the label table using the one or more labels from the MPLS label stack;
otherwise, performing the next-hop lookup in the label table using the entries in the label table.

4. The method of claim 1, further comprising:
in response to determining that the table identifier is not present in the MPLS label stack:
determining a default table;
determining the next hop for the data communications packet by performing the next-hop lookup in the default table using a first label from the MPLS label stack;
and forwarding the data communications packet to the next hop.

5. The method of claim 1, further comprising:
determining whether an expanded traffic class modifier is set in the MPLS label stack; and
in response to determining that the expanded traffic class modifier is set in the MPLS label stack, determining that a payload of the data communications packet comprises a type-of-service message associated with the data communications packet.

6. The method of claim 1, further comprising:
determining whether an operation-administration-maintenance (OAM) modifier is set in the MPLS label stack; and
in response to determining that the OAM modifier is set in the MPLS label stack, determining that a payload of the data communications packet comprises an OAM message associated with the data communications packet.

7. The method of claim 1, wherein the one or more labels in the MPLS label stack have variable lengths, specified by a respective label length parameter included in the MPLS label stack.

8. A non-transitory computer-readable storage medium storing one or more sequences of instructions which, when executed by one or more processors, cause the one or more processors to perform operations comprising:
receiving a data communications packet comprising one or more labels in a Multiprotocol Label Switching (MPLS) label stack;
determining whether a table identifier is present in the MPLS label stack;
wherein the table identifier identifies a label table in which next-hop information for the data communications packet is stored and which is indexed using at least the one or more labels included in the MPLS label stack of the data communications packet;
in response to determining that the table identifier is present in the MPLS label stack:
based, at least in part, on the table identifier, determining the label table; determining a next hop for the data communications packet by performing a next-hop lookup in the label table using at least one of the one or more labels; and
forwarding the data communications packet to the next hop.

9. The non-transitory computer-readable storage medium of claim 8, wherein the instructions for determining the next hop for the data communications packet further comprise instructions which, when executed, cause the one or more processors to perform operations comprising:
determining whether an end-of-ministack modifier is set in the MPLS label stack; in response to determining that the end-of-ministack modifier is set in the MPLS label stack, performing the next-hop lookup in the label table using two or more labels from the MPLS label stack.

10. The non-transitory computer-readable storage medium of claim 8, wherein the instructions for determining the next hop for the data communications packet further comprise instructions which, when executed, cause the one or more processors to perform operations comprising:
  determining whether a prefix modifier is set in the MPLS label stack;
  in response to determining that the prefix modifier is set in the MPLS label stack entries in the label table:
  determining whether the one or more labels from the MPLS label stack are longer than entries in the label table;
  in response to determining that the one or more labels from the MPLS label stack are longer than the entries in the label table, performing the next-hop lookup in the label table using the one or more labels from the MPLS label stack and entries in the label table.

11. The non-transitory computer-readable storage medium of claim 8, further storing instructions which, when executed, cause the one or more processors to perform operations comprising:
  in response to determining that the table identifier is not present in the MPLS label stack:
  determining a default table;
  determining the next hop for the data communications packet by performing the next-hop lookup in the default table using a first label from the MPLS label stack; and
  forwarding the data communications packet to the next hop.

12. The non-transitory computer-readable storage medium of claim 8, further storing instructions which, when executed, cause the one or more processors to perform operations comprising:
  determining whether an expanded traffic class modifier is set in the MPLS label stack; and
  in response to determining that the expanded traffic class modifier is set in the MPLS label stack, determining that a payload of the data communications packet comprises a type-of-service message associated with the data communications packet.

13. The non-transitory computer-readable storage medium of claim 8, further storing instructions which, when executed, cause the one or more processors to perform operations comprising:
  determining whether an operation-administration-maintenance (OAM) modifier is set in the MPLS label stack; and
  in response to determining that the OAM modifier is set in the MPLS label stack, determining that a payload of the data communications packet comprises an OAM message associated with the data communications packet.

14. The non-transitory computer-readable storage medium of claim 8, wherein the one or more labels in the MPLS label stack have variable lengths, specified by a respective label length parameter included in the MPLS label stack.

15. A computer system, comprising:
  one or more processors; a data packet switching system coupled to the one more processors and configured to switch or route data packets between ingress network interfaces and egress network interfaces;
  a traffic unit, communicatively coupled to the one or more processors, and configured to perform:
  receiving a data communications packet comprising one or more labels in a Multiprotocol Label Switching (MPLS) label stack;
  a MPLS label stack unit, communicatively coupled with the one or more processors and the traffic unit, and configured to perform operations comprising:
  determining whether a table identifier is present in the MPLS label stack;
  wherein the table identifier identifies a label table in which next-hop information for the data communications packet is stored and which is indexed using at least the one or more labels included in the MPLS label stack of the data communications packet;
  in response to determining that the table identifier is present in the MPLS label stack:
  based, at least in part, on the table identifier, determining the label table; determining a next hop for the data communications packet by performing a next-hop lookup in the label table using at least one of the one or more labels; and
  forwarding the data communications packet to the next hop.

16. The computer system of claim 15, wherein the MPLS label stack unit is further configured to perform operations comprising:
  determining whether an end-of-ministack modifier is set in the MPLS label stack;
  in response to determining that the end-of-ministack modifier is set in the MPLS label stack, performing the next-hop lookup in the label table using two or more labels from the MPLS label stack.

17. The computer system of claim 15, wherein the MPLS label stack unit is further configured to perform operations comprising:
  determining whether a prefix modifier is set in the MPLS label stack;
  in response to determining that the prefix modifier is set in the MPLS label stack:
  determining whether the one or more labels from the MPLS label stack are longer than entries in the label table;
  in response to determining that the one or more labels from the MPLS label stack are longer than the entries in the label table, performing the next-hop lookup in the label table by determining a longest match between the one or more labels from the MPLS label stack and entries in the label table.

18. The computer system of claim 15, wherein the MPLS label stack unit is further configured to perform operations comprising:
  in response to determining that the table identifier is not present in the MPLS label stack:
  determining a default table;
  determining the next hop for the data communications packet by performing the next-hop lookup in the default table using a first label from the MPLS label stack; and
  forwarding the data communications packet to the next hop.

19. The computer system of claim 15, wherein the MPLS label stack unit is further configured to perform operations comprising:
  determining whether an expanded traffic class modifier is set in the MPLS label stack;

in response to determining that the expanded traffic class modifier is set in the MPLS label stack, determining that a payload of the data communications packet comprises a type-of-service message associated with the data communications packet.

20. The computer system of claim 15, wherein the one or more labels in the MPLS label stack have variable lengths, specified by a respective label length parameter included in the MPLS label stack.

* * * * *